United States Patent [19]

Turchany et al.

[11] Patent Number: 5,665,410
[45] Date of Patent: Sep. 9, 1997

[54] METHOD FOR EXTENDING A DOUGH RISE PERIOD

[75] Inventors: Joanne M. Turchany, Kewaskum; Robert V. Myszka, Germantown, both of Wis.

[73] Assignee: The West Bend Company, West Bend, Wis.

[21] Appl. No.: 580,352

[22] Filed: Dec. 28, 1995

[51] Int. Cl.⁶ ............................................. A21D 8/00
[52] U.S. Cl. ..................... 426/231; 99/327; 426/496; 426/504
[58] Field of Search ....................... 426/520, 496, 426/504, 549, 231; 99/327, 335

[56] References Cited

U.S. PATENT DOCUMENTS

| | | | |
|---|---|---|---|
| 4,107,341 | 8/1978 | Seiling | 426/504 |
| 4,415,799 | 11/1983 | Tanaka et al. | 99/325 |
| 4,538,509 | 9/1985 | Ojima et al. | 99/348 |
| 4,951,559 | 8/1990 | Arao et al. | 99/348 |
| 4,984,512 | 1/1991 | Takahashi et al. | 99/327 |
| 5,386,763 | 2/1995 | Chen | 426/504 |
| 5,415,081 | 5/1995 | Yoshida et al. | 99/326 |

*Primary Examiner*—George Yeung
*Attorney, Agent, or Firm*—Jansson & Shupe, Ltd.

[57] ABSTRACT

Disclosed is a method for preselected extension of the dough rise period for dough products prepared in an automatic breadmaker. The method includes the step of selecting an extended final dough rise period from a group of predetermined times programmed into the breadmaker controller. The selection may be made before initiating the kneading/degassing and rising cycles or during what would otherwise be the final dough rise period.

15 Claims, 4 Drawing Sheets

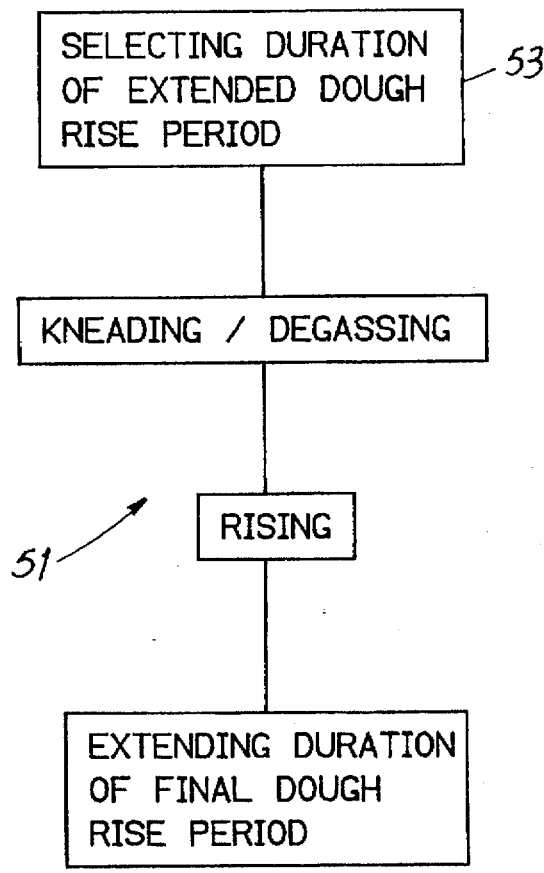
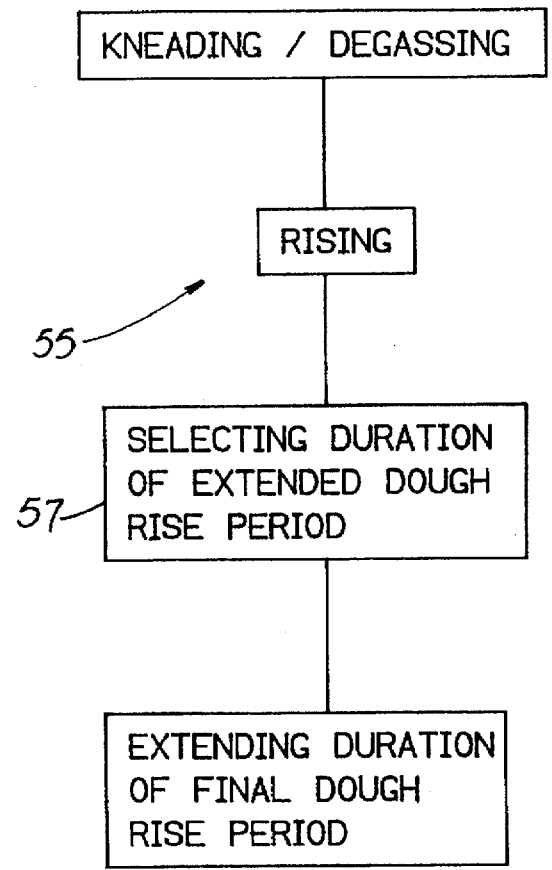
FIG. 5
FIG. 6

METHOD FOR EXTENDING A DOUGH RISE PERIOD

FIELD OF THE INVENTION

This invention is related generally to breadmaking and, more particularly, to a method for controlling the rise time of dough.

BACKGROUND OF THE INVENTION

Automatic breadmakers for home use are becoming increasingly popular, in part because the user is able to prepare specialty and custom loaves of bread of a type not available or not readily available at commercial outlets. Another reason for the popularity of such breadmakers is that bread can be consumed when warm, i.e., immediately at the conclusion of baking. Warm, freshly baked bread has a unique aroma and texture that adds to dining pleasure.

There are a number of examples of automatic breadmakers in the patent literature. U.S. Pat. Nos. 5,415,081 (Yoshida et al.); 4,415,799 (Tanaka); 4,951,559 (Arao et al.); 4,538,509 (Ojima et al.) and 4,984,512 (Takahashi et al.) are but a few.

A significant problem in breadmakers of the prior art involves regulation of the time period during which the dough is permitted to rise. This "dough rise period" is the time period during which carbon dioxide gas emitted from yeast in the dough causes the dough to rise or expand.

Typically there are several dough rise periods involved in preparation of dough with an automatic breadmaking machine. The dough ingredients (e.g., wheat flour, sugar, water, milk, yeast, shortening, salt, etc.) are first combined and then mixed by the breadmaking machine. The dough is then permitted to rise. Following this first rise period, the machine kneads and "degasses" the dough, causing carbon dioxide to be released from the dough and reducing the size of the dough mass. The dough is then permitted to rise a second time. A further step of kneading/degassing is typically followed by a third, or final, dough rise period.

Proper regulation of the final dough rise period is particularly important to ensure that the dough has the proper size, appearance, and texture prior to baking. If the final dough rise period is of insufficient duration, the dough mass will be short and flat. The appearance of the final baked product will be stunted and, at least in appearance, unlike that of a commercial bakery loaf. Moreover, inadequate carbon dioxide in the dough will cause the texture of the dough to be unsatisfactory. Such dough will be dense, chewy, tough and generally unappealing.

The duration of the dough rise period needed may vary based on conditions such as the type of dough being used. For example, it is well known that whole wheat dough takes longer to rise than dough made with sifted flour. Temperature and humidity affect the rate at which dough rises.

The rise time may also be affected by the biological activity of the yeast or the amount of yeast used. All of these concerns suggest that the ability to regulate or extend the final dough rise period would be of great assistance in preparation of bread with an automatic breadmaker. Prior art automatic breadmakers do not address these problems in an entirely satisfactory way.

Many known automatic breadmakers have a final dough rise period but with a preset duration that cannot be changed. Importantly, these breadmakers do not provide for extension of the final dough rise period in the event the dough has failed to rise as expected. For example, the disclosures of the Tanaka and Arao et al. patents involve final dough rise periods, the durations of which are preset and cannot be extended.

The Ojima et al. patent describes three dough rise, or "fermentation," periods each of a preprogrammed duration. Again, there is no accommodation for extending the final dough rise period in the event the dough has not risen a sufficient amount.

The Yoshida et al. patent describes a mechanism to extend the final dough rise period but this arrangement is less than satisfactory because selection of the extended dough rise period may only be made after the machine operating cycle is initiated and before (but not after) the final rise period begins. This is particularly inconvenient if, during the final dough rise period, the user discovers that the dough has failed to rise as anticipated.

And another inconvenience is that the user of the breadmaker is unable to use (at least unable to conveniently use) any delayed-start feature to start the machine at, e.g., 2:00 AM so that fresh bread available early in the morning. In other words, the user must be present at machine startup if the final rise period is to be extended.

The Takahashi et al. patent describes three modes of operation for a breadmaker, namely, fully automatic, semi-automatic and manual. In the manual mode it is possible for the user to manually shorten the preprogrammed duration of each step of the breadmaking process. The duration of each step may be stored in memory for subsequent use.

Takahashi's manual mode, the only mode in which the duration of the final rise period may be changed, is complicated and requires the user to select the duration of all time increments of the overall breadmaking cycle. If such time increments are not so selected, the machine uses "default" durations programmed into it. And one may not increase the preprogrammed "default" duration of the final rise period but may only decrease such duration. To put it in other words, no way is provided to extend the default time, should the dough not rise as anticipated.

Thus, known automatic breadmakers are incapable of providing the user with the ability to conveniently and easily regulate the duration of the final rise period both before breadmaker activation and during the final dough rise period itself. An improved method of operation for a breadmaker permitting greater flexibility in regulation of the final dough rise period so as to provide attractive, soft and delicious bread would be an important advance in the art.

OBJECTS OF THE INVENTION

It is an object of this invention to provide a method for controlling the duration of the rise period of dough prepared in an automatic breadmaker which overcomes problems and shortcomings in the art, including those mentioned above.

It is a further object of this invention to provide a method for controlling the duration of the rise period of dough prepared in an automatic breadmaker in which the duration of the final dough rise period may be extended.

A still further objective of the invention is to provide a method for controlling the rise period of dough prepared in an automatic breadmaker in which the user has an opportunity to select one of plural predetermined time increments by which the final rise period will be extended.

Yet another object of the invention is to provide a method for controlling the rise period of dough prepared in an automatic breadmaker in which the duration of the final dough rise period may be selected either before initiating a breadmaking cycle or after the last degassing step.

It is also an object of the invention to provide a method for controlling the rise period of dough prepared in an automatic breadmaker in which the control mechanism is simple and easy to use.

How these and other objects are accomplished will become apparent from the following descriptions and from the drawings.

SUMMARY OF THE INVENTION

The invention involves a method for controlling the rise period of dough prepared in an automatic breadmaker having at least one dough rise period of predetermined duration. The method includes steps for extending the duration of the final dough rise period including the step of selecting a rise-extending time from among a group of at least two preprogrammed times.

It is preferred that the new method include at least two preprogrammed times for extending the final rise time, one preprogrammed time of which is of substantially less duration than the second. In more specific aspects of the method, one time period is no greater than 15 minutes (and is preferably about 10 minutes) and the second time period is no greater than 30 minutes (and is preferably about 20 minutes). In other aspects of the method, the selecting step is followed by the step of initiating a breadmaking cycle or the selecting step follows the last degassing step.

It is highly preferred that the method be easy to implement and that the breadmaking machine include a user's panel having a control mechanism for selecting the duration of the final dough rise period. In a specific embodiment, such mechanism is a single button activated by the user, the first time period is selected by once activating the mechanism and the second time period is selected by twice activating the mechanism.

Further details of the invention are set forth in the following detailed description and in the drawings.

BRIEF DESCRIPTION OF THE DRAWINGS

FIG. 5 is a flow diagram illustrating one aspect of the method of this invention.

FIG. 6 is a flow diagram showing another aspect of the method of this invention.

DETAILED DESCRIPTIONS OF THE PREFERRED EMBODIMENTS

Figure 1:
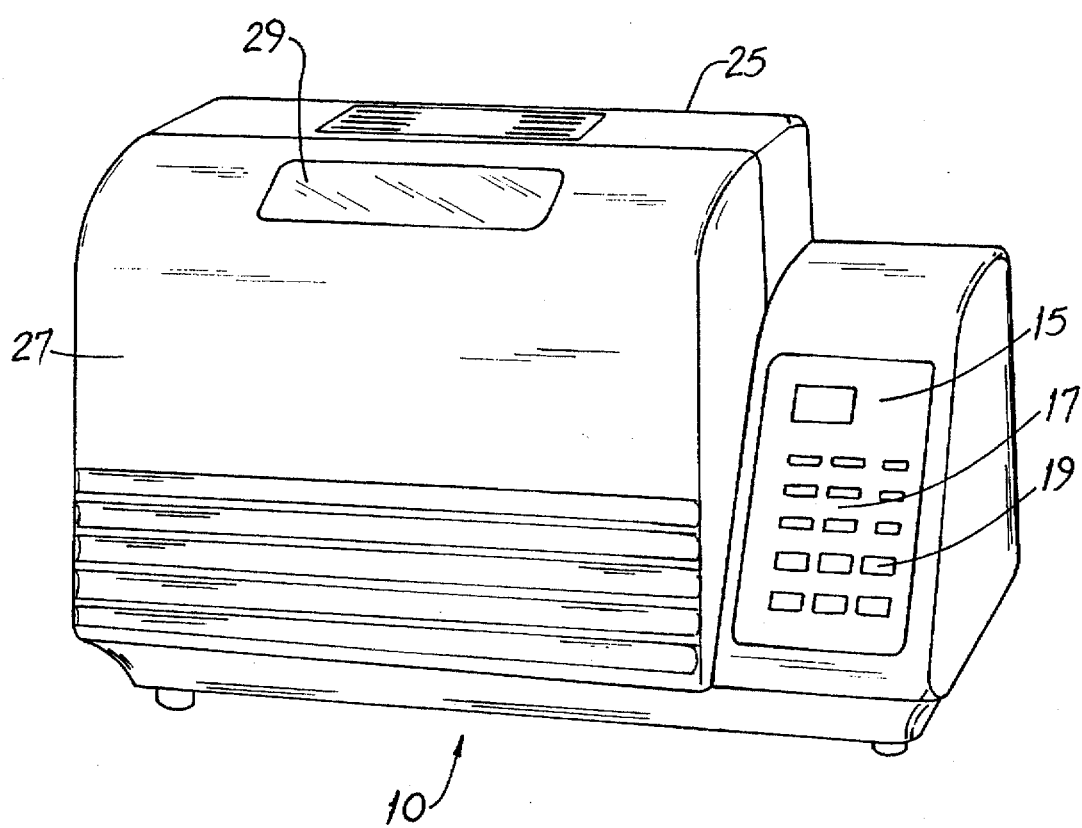
FIG. 1 is a perspective view of an exemplary automatic breadmaker which may be used to carry out the method.
Figure 2:
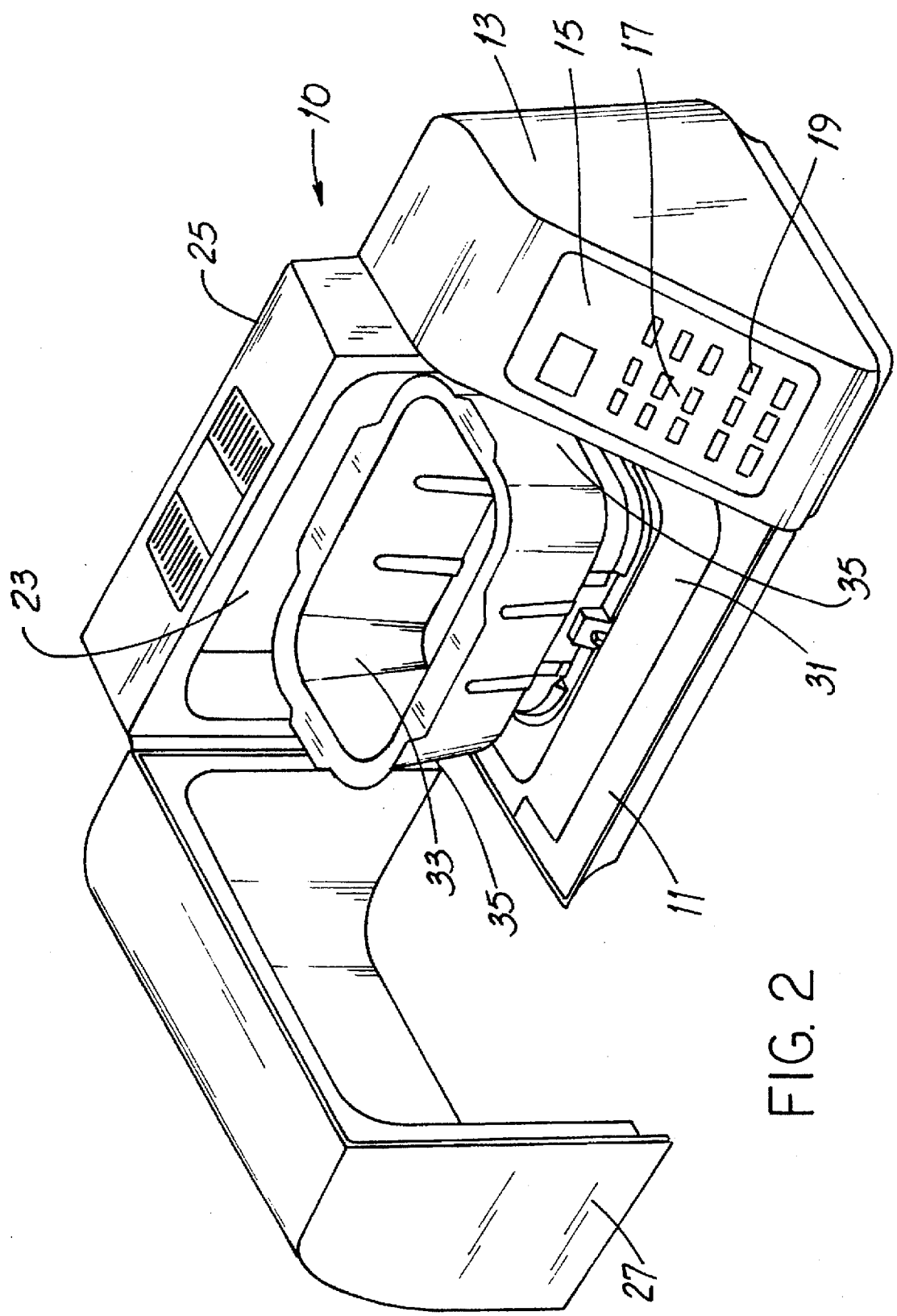
FIG. 2 is a perspective view of the breadmaker of FIG. 1 with the door open.

Before describing details of the new method, it will be helpful to have an understanding of one type of automatic breadmaker which may be used to carry out such method. Referring first to FIGS. 1 and 2, an automatic breadmaker 10 has a base or floor 11 and a compartment 13 atop the floor. Such compartment 13 has a user's panel 15 with a control mechanism 17 for selecting the dough rise periods. A separate control mechanism in the form of a single button 19 is provided for selecting a time by which the final dough rise period may be extended. Of course, other control arrangements are possible.

Compartment 13 encloses a controller (not shown) and a reversible electric motor (not shown). The controller executes all of the steps making up the operating cycle of the breadmaker 10. The motor powers kneading members 21 which mix ingredients to make bread dough.

An oven chamber 23 is atop the floor 11, abuts the compartment 13 and is formed by the floor 11, a wall member 25 and an access door 27 having a window 29 allowing the user to view kneading and baking operations. The access door 27 is hinged to the wall member 25 and swings in a substantially horizontal direction and creates a front opening 31 extending substantially to the floor 11, to the region above the pan 33 and to the side portions 35.

Figure 3:
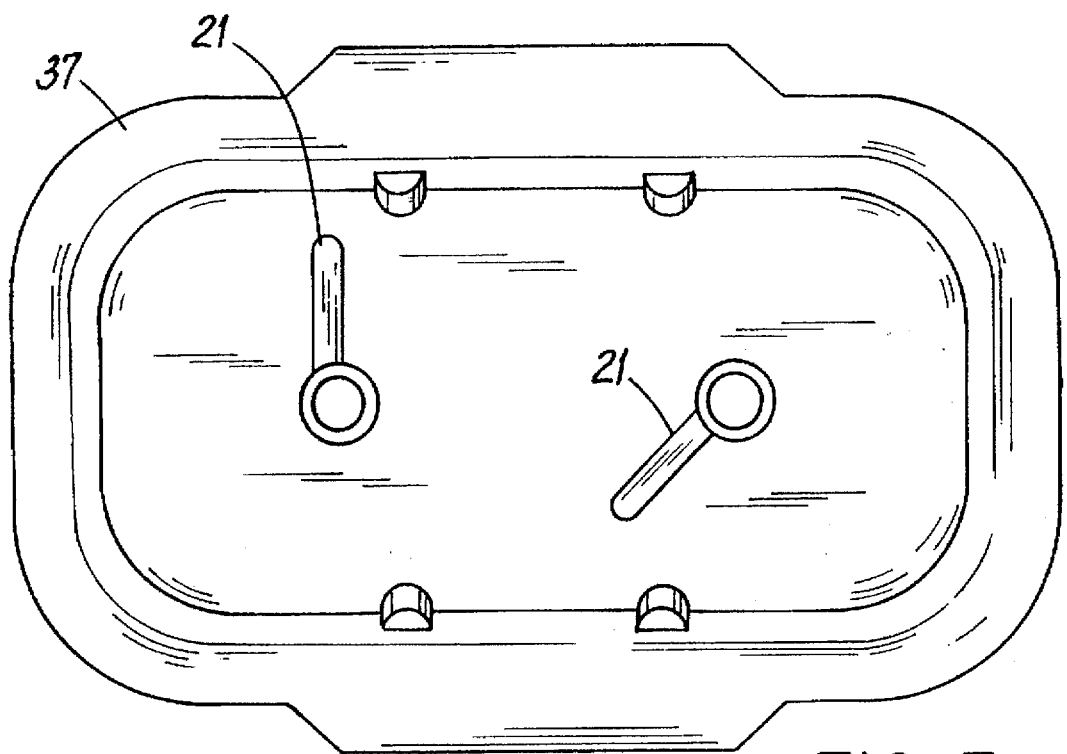
FIG. 3 is a top plan view of one embodiment of a pan used with the breadmaker of FIGS. 1 and 2. Dough kneading members are shown.
Figure 4:
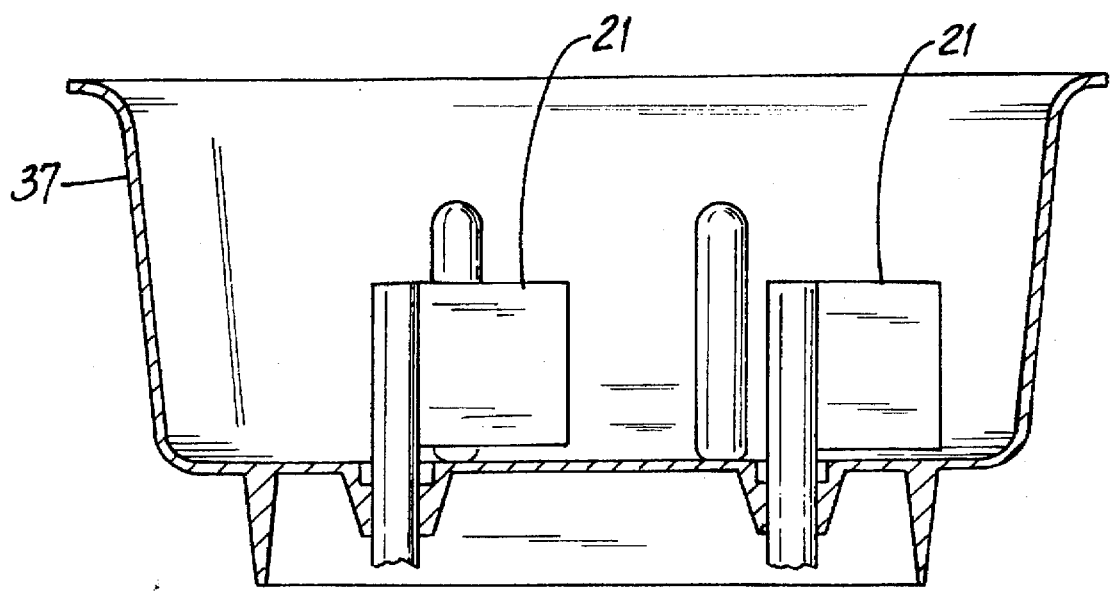
FIG. 4 is a cross-section side elevation view of the pan of FIG. 3.

FIGS. 3 and 4 show an elongate horizontal pan 33 for receiving ingredients mixed to make bread dough. For breadmaking, the pan 33 is mounted in the chamber 23. Dough positioned in pan 33 is manipulated by the kneading members 21 which are rotated in forward and reverse directions by the motor operating through a gear train (not shown).

In operation, dough ingredients are placed in pan 33, the pan 33 is placed in the chamber 23 and the breadmaker 10 executes steps involving ingredient mixing, dough kneading and dough degassing. Each degassing step is followed by a dough rise period. Kneading and manipulation of the dough is caused by rotation and counter-rotation of kneading members 21. In the breadmaker 10, the duration of each mixing, kneading, degassing and rising step is preprogrammed.

The present invention involves a method to extend the duration of the final dough rise period and the flow diagram 51 of FIG. 5 shows one way to practice the invention. In this aspect of the method, the user preprograms the breadmaker to extend the final rise period before initiating machine operation, i.e., before the breadmaker starts its first mixing step. This causes the breadmaker 10 to provide an extended rise period with respect to the dough and yet be activated (in the middle of the night, for example) by a delayed-start feature.

As represented by the symbol 53, the user selects the extended dough rise period by manipulating a button 19 on control panel 15. In a preferred method, the extended dough rise period is selected from a group of two predetermined time periods of, for example, 10 and 20 minutes. The first time is selected by once activating the button 19 and the second time is selected by twice activating the button 19. Of course, many variations as to the number and duration of these time increments and as to the control mechanism are possible.

Following selection of the extended dough rise period, the breadmaker 10 prepares the dough by executing mixing, kneading, rising and degassing steps including at least one sequence of steps involving dough kneading, and degassing followed by a final dough rise period. The breadmaker automatically extends the duration of the final dough rise period by "adding" to the duration of the normal final rise period and the duration of the extended period. The conclusion of the extended final rise period may be followed by baking. Or the user may then remove the dough and, e.g., freeze it for later use.

Another variation of the inventive method is represented by the flow diagram 55 of FIG. 6. According to this aspect of the method, the breadmaker 10 first carries out the normal, preprogrammed mixing, kneading, degassing and rising steps. No selection of an extended dough rise period is made prior to these steps.

As represented by the symbol 57, selection of the extended dough rise period is made by the user during and shortly near the conclusion of the normal final dough rise period. For example, the user would be notified, by an alarm or otherwise, at, e.g., 5 minutes before the baking step (which would also be 5 minutes prior to the conclusion of the final rise period) and would thereby be afforded an opportunity to inspect the dough through window 29 to determine if the dough had risen sufficiently. The user would then select an extended rise period if additional rising time were required.

The extended dough rise period is preferably selected from a group of two predetermined time periods of, for example, 10 and 20 minutes. The first time period is selected by once activating the button 19 and the second time period is selected by twice activating the button 19. Again, many variations as to the number and duration of these time increments and as to the control mechanism would be possible.

From the foregoing it will be appreciated that the inventive method enhances the user's ability to create attractive, delicious dough-based products using an automatic breadmaker. In particular, the method avails the user of the breadmaker with some easy-to-use options for extending the final dough rise time if needed. As used herein, the term "extended dough rise period" means a time duration by which the duration of the final cycle involving dough rising is lengthened.

While the principles of this invention have been described in connection with specific embodiments, it should be understood clearly that these descriptions are made only by way of example and are not intended to limit the scope of the invention.

What is claimed is:

1. A method for extending the duration of a final dough rise period in an automatic breadmaking machine for processing dough using a final dough rise period, the method comprising the steps of:

selecting a rise-extending time from a group of at least two preprogrammed times for extending the duration of the final dough rise period; and initiating a breadmaking cycle.

2. The method of claim 1 wherein the group of at least two preprogrammed times comprises a first time and a second time substantially longer than the first time.

3. The method of claim 2 wherein the first time is no greater than 15 minutes and the second time is no greater than 30 minutes.

4. The method of claim 3 wherein the first time is about 10 minutes and the second time is about 20 minutes.

5. The method of claim 1 wherein the breadmaking machine includes a user's panel having a control mechanism for selecting the times.

6. The method of claim 5 wherein the mechanism is a single button activated by a machine user for selecting the times.

7. The method of claim 6 wherein the first time is selected by once activating the mechanism and the second time is selected by twice activating the mechanism.

8. A method for extending the duration of a final dough rise period in an automatic breadmaking machine for processing dough using a final dough rise period, the method comprising the steps of:

actuating a signal during the last dough rise period; and selecting a rise-extending time from a group of at least two preprogrammed times for extending the duration of the final dough rise period.

9. The method of claim 8 wherein the signal is actuated near the end of the last dough rise period.

10. The method of claim 9 wherein the group of at least two preprogrammed times comprises a first time which is substantially less than the second time.

11. The method of claim 10 wherein the first time is no greater than 15 minutes and the second time is no greater than 30 minutes.

12. The method of claim 11 wherein the first time is about 10 minutes and the second time is about 20 minutes.

13. The method of claim 1 wherein the breadmaking machine includes a user's panel having a control mechanism for selecting the times.

14. The method of claim 13 wherein the mechanism is a single button activated by the machine user for selecting the times.

15. The method of claim 13 wherein the first time is selected by once activating the mechanism and the second time is selected by twice activating the mechanism.

* * * * *